Sept. 2, 1969            D. B. GREENE            3,464,158
PET PORTAL FOR SLIDING GLASS DOORS
Filed Nov. 3, 1967
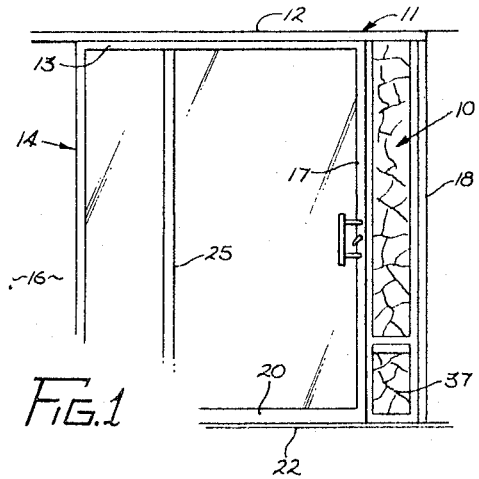
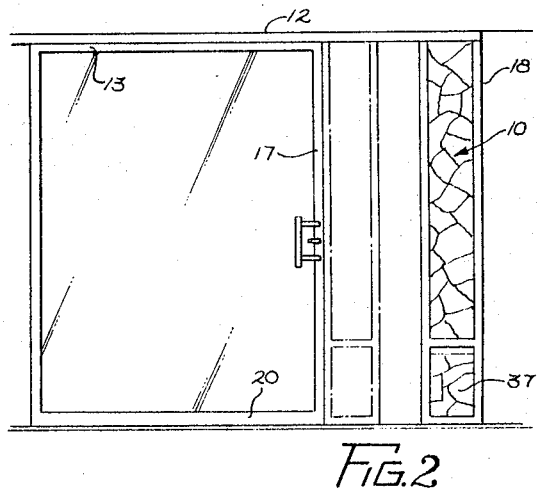
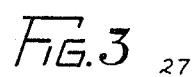
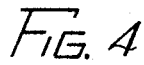
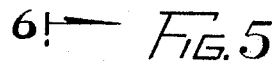
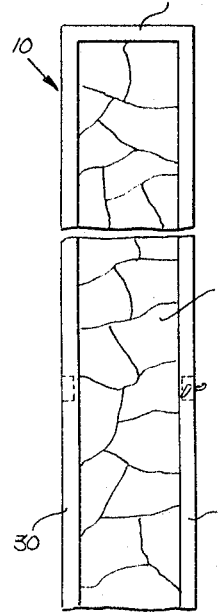
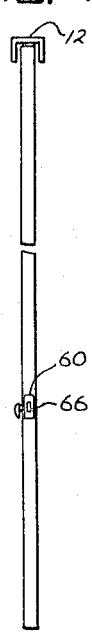
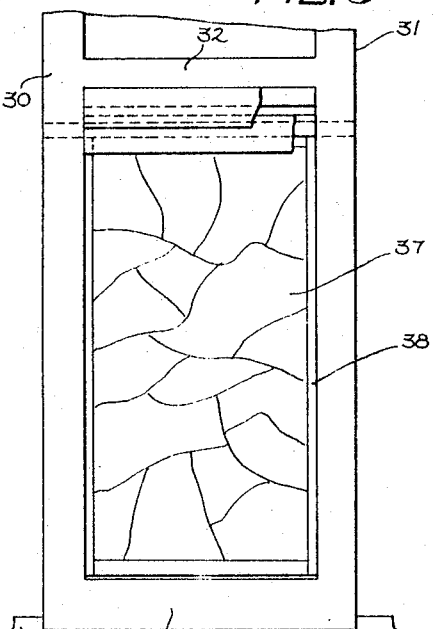
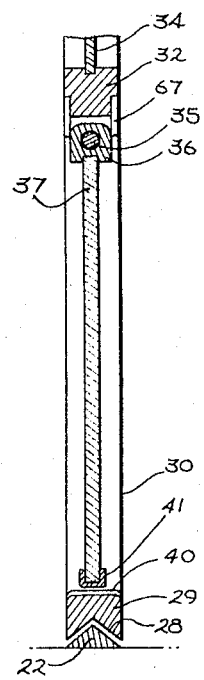
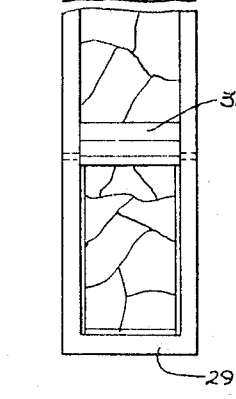
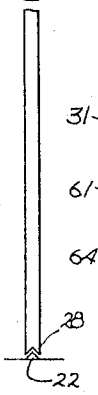
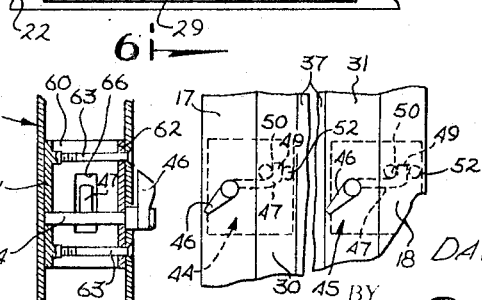
INVENTOR.
DAVID B. GREENE
BY R. E. Geangue
ATTORNEY

United States Patent Office 3,464,158
Patented Sept. 2, 1969

3,464,158
PET PORTAL FOR SLIDING GLASS DOORS
David B. Greene, 4363 Sarah St.,
Burbank, Calif. 91505
Filed Nov. 3, 1967, Ser. No. 680,469
Int. Cl. E05d *15/48;* E05f *11/52*
U.S. Cl. 49—168                                    6 Claims

ABSTRACT OF THE DISCLOSURE

The pet portal for sliding glass doors is located in a separate portal panel which is slidably mounted in the door frame in the same manner as the sliding door. The panel is inserted between the edge of the sliding door and the door frame and can be locked both to the permanent door frame and to the sliding door to prevent access through the door while still providing a pet portal. To gain access through the door, the panel can be unlocked either from the stationary door frame or from the sliding glass door.

---

This invention relates to a pet portal for sliding glass doors, and more particularly, to a pet portal which can be installed in sliding glass door structures without any modification of the door structure itself.

When pets are kept in the home, it is customary to provide a small outlet door so that the pet can leave and enter the home at will. It is necessary to keep such a door continually covered to keep out the elements and to cut down on heating and cooling loads. In some instances, a swinging panel is located within the door opening so that it can be pushed open in either direction by the pet walking through the opening. In other instances, a split rubber panel is placed in the door opening so that the pet can pass through. These prior pet doors or portals have required that an opening be cut in a door or side of the house and such an opening permanently damages the home structure. When it is desired that the pet have access to the exterior through a sliding glass door structure, it has been necessary to leave the door ajar so that the home interior is continually subjected to weather conditions. Obviously, it is not feasible to cut an opening in a panel of a sliding glass door since glass is not an easy material to work with and such a panel would be unsightly.

The present invention provides a pet portal in a separate, auxiliary panel which can become an integral working part of the sliding glass door structure by fitting it onto the framework of the door. The separate pet portal panel can be light in weight and can be portable so that it can be easily attached to or removed from the track of the sliding glass door and can thus be moved from one door to another. The panel locks directly onto the permanent door frame and onto the sliding door so that it becomes virtually burglar proof because it is immovable. Also, in the event the house is to be locked for any considerable length of time, the panel can be easily removed from the door frame and the door can be securely locked in the usual manner against access.

The portal in the separate panel can consist of an opening covered by a swinging portal door and the portal door is completely weatherproofed around its edges to protect the inside of the house against the elements. Also, the portal door is designed to remain in the closed position when not in use by the pet and it cannot be blown open by the force of wind. The pet portal panel is adaptable to either right or left sliding doors by simply reversing the locks so that the locks project in the left direction for right moving doors and in the right direction for left moving doors. The pet portal panel can be constructed of glass, wood, aluminum or any other suitable material which esthetically combines the panel with the sliding door itself.

It is therefore an object of the present invention to provide a pet portal for sliding glass doors which consists of a separate panel located between the sliding door and the permanent door frame and containing a pet opening.

Another object of the invention is to provide a pet portal for sliding glass doors which comprises a panel that can be locked both to the permanent door frame and to the sliding door in order to prevent opening of the door from the outside; said panel having a pet opening therein.

Another object of the invention is to provide a pet portal for a sliding glass door; the portal being in a separate panel which is easily attached and locked to existing sliding door structure without the necessity of any alteration.

These and other objects of the invention not specifically set forth above will become readily apparent from the accompanying description and drawings in which:

FIGURE 1 is a side elevational view of a sliding glass door structure with the separate port panel installed and the sliding door in closed position;

FIGURE 2 is a side elevational view similar to FIGURE 1 with the sliding glass door open; the dotted line position indicating the condition where the separate port panel remains attached to the glass door;

FIGURE 3 is a side elevational view of the port panel removed from the sliding glass door structure;

FIGURE 4 is an end elevational view showing the manner in which the port panel is supported on the track for the sliding glass door;

FIGURE 5 is an enlarged side elevational view showing the manner in which a pet door is pivotally mounted in the separate panel;

FIGURE 6 is a vertical section along line 6—6 of FIGURE 5 showing the pivot structure for the pet door;

FIGURE 7 is a partial side elevational view showing the port panel locked to both the sliding glass door and to the permanent door frame; and FIGURE 8 is a vertical section along line 8—8 of FIGURE 7 showing the lock for locking the port panel in closed position.

Referring to the embodiment of the invention chosen for purposes of illustration, the portal panel 10 can be attached to a standard sliding door frame construction 11 normally consisting of a top channel guide member 12 which receives the top frame member 13 of a sliding glass door 14. The glass door 14 normally overlaps a stationary glass panel 16 when the door is opened by moving it to the left in FIGURE 1. The front frame member 17 at the closure edge of the door 14 normally abuts the permanent door frame 18 which is rigidly attached to the structure of the house and the usual latch is provided on the frame member 17 for locking the frame member 17 to the permanent frame 18. The lower frame member 20 of the sliding glass door 14 has a bottom V-shaped edge which slides on a permanent V-shaped track 22 (see FIGURE 4). One side of stationary panel 16 is secured to frame member 25 which forms one edge of the door opening.

As illustrated in FIGURES 1 and 2, the portal panel 10 is located between the frame member 17 at the closure edge of the sliding glass door and the stationary frame member 18 attached to the building. The top frame member 27 of the panel 10 is inserted upwardly into the channel 12 and the V-shaped groove 28 on the lower edge of bottom frame member 29 slides on the permanent rail 22. Thus, the portal panel 10 can be moved along the door opening in the same manner as the sliding door 14.

The sliding glass door can be movably mounted in various types of door frame constructions, and for each different frame construction, the port panel is preferably constructed for movement in the same manner as the sliding door. It is understood, however, that the sliding support for the port panel can vary from that for the sliding glass door.

The panel 10 has side frame members 30 and 31 and a cross frame member 32. A glass panel 34 extends between the side members 30 and 31 and between the cross member 32 and the top member 27. A dowel pin 35 is secured at its opposite ends in frame members 30 and 31 and passes through a pet door support member 36 in order to pivotally mount the same. The support member 36 is secured to the edge of a door panel 37 which substantially covers a pet portal 38 in the port panel 10 between the cross frame member 32 and the bottom frame member 29. The door panel 37 can be made of the same material as the panel 34 or it can be made of any other type of material which can be moved by a pet passing through the pet portal opening 38. The upper edge of the cross member 29 can support a sheet of magnetic material 40 and the lower edge of the pet door can support a magnetic material 41 which is attracted by the magnet 40 in order to always return the door to its closed position and hold it there against exterior weather conditions. When the panel 10 is installed, the pet portal 38 provides an opening through the door structure for the pet. At the same time, there is no major opening in the sliding glass door which would subject the interior to the outdoor weather conditions or permit the entry of undesirable insects, bugs, etc.

As illustrated in FIGURE 7, frame member 17 of door 14 carries a latch mechanism 44 and a similar latch mechanism 45 is carried by frame member 31 of the panel 10. Each of the mechanisms have an exterior handle 46 attached to a latch arm 47. Each of the frame members 18 and 30 have an edge opening for receiving the hook end 49 of a latch arm 47 and the hook end can be moved by handle 46 into position behind a pin 50 carried by frame members 18 and 30. A rubber gripping member 52 can extend between the sides of the frame members 18 and 30 in order to grip and hold a hook end 49 in locking position behind a pin 50 and still permit unlocking of the latches by a clockwise force applied through the handles 46. As illustrated in FIGURE 7, the port panel 10 can be locked to the stationary frame member 18 and the sliding glass door 14 can be locked to the panel 10 by counterclockwise rotation of handles 46 when the door 14 and panel 10 are in the position of FIGURE 1. Thus, after the panel 10 is installed, the door 14 can be closed and locked to be burglar proof and only the small pet opening 38 in the panel 10 is available for entrance. Also, a lock (not shown) can be provided for the pet door 37 so that it can be locked from the inside. It is understood that suitable weatherproofing, such as strip 67 between the crosspiece 32 and the door hanger 34 can be placed around the edges of the door 37 in order to prevent exchange of air with the outside.

Referring to FIGURE 8, each lock mechanism 44, 45 comprises an end panel 60 and side panels 61 and 62. Each lock mechanism is secured by means of screws 63 which pass through one side of the frame member 31 (or 17) and terminate in sockets in the side 61. Also, a pivot shaft 64 extends between sides 61 and 62 and through an opening in the side of frame member 31 (or 17) so that the handle 46 can be secured to the outside end of the shaft. The latch arm 47 extends from the shaft 64 through an end opening 66 in the end panel 60 so that hook end 49 can be inserted around a latch pin 50 by rotation of a handle 46. It is of course understood that any suitable type of latching mechanisms can be utilized which will lock the port panel 10 to both the door 14 and the permanent frame 18.

When it is desired to open the glass door 14, either the lock mechanism 44 or the lock mechanism 45 can be unlocked. When the lock 44 is unlocked, the port panel 10 remains with the side frame member 18 and the door 14 is moved to provide an opening between the edge of the panel 10 and the door. On the other hand, when the latch 45 is unlatched, the door 14 and the panel 10 can move together as indicated by the dotted line position in FIGURE 2 in order to provide an opening between the edge of the panel 10 and the door.

It is apparent that the present invention provides a pet portal which is easily accessible to the family pet and which is easily attached to existing sliding glass door structures. The type of material used for the panel 10 and the pet door 37 can be made to match the material of the sliding glass door 14 and the panel 10 can be disassembled without the necessity of cutting any of the structures of the building or the glass door. The panel 10 can be fabricated of light weight material so that it is completely portable and can be temporarily removed when the quarters are unoccupied so that the sliding glass door can be locked directly to the frame member 18. The covering of the portal 38 by the swinging door 37 permits year around comfort in the interior and wards off outside elements and keeps out flying insects. The invention is applicable to either doors that slide from left to right as illustrated in the drawings or from right to left since it is only necessary that the locks be reversed to provide proper attachment of the panel to the sliding door and to the permanent door frame. Various other modifications are contemplated by those skilled in the art without departing from the spirit and scope of the invention.

What is claimed is:

1. A pet portal for a sliding glass door mounted in a stationary frame forming a door opening comprising:
   a removable panel located in said frame and between the closure edge of said sliding glass door and one side of said frame;
   said closure edge and said one frame side and the edges of said panel opposite thereto being of the same shape in order to close said door opening by placing the edges of said panel adjacent said closure edge and said one side and by moving said closure edge into abutment with said one frame side after said panel has been removed from said frame;
   means for selectively attaching said panel to said door and to said one frame side for selectively retaining said panel in said frame in position to close said door opening and for selectively removing said panel from said door opening; and
   a pet portal in said panel through which said pet can pass.

2. A pet portal for a sliding glass door as defined in claim 1 having means for slidably mounting said panel in said frame independently of said door for sliding movement in the same directions as said sliding glass door.

3. A pet portal for a sliding glass door as defined in claim 1 wherein said selective attaching means comprise lock means on each side of said panel for locking said panel to said sliding glass door on one side thereof and to said stationary frame on the other side thereof.

4. A pet portal for a sliding glass door as defined in claim 2 wherein said mounting means comprise a top channel of said frame for receiving the top of said panel, and a bottom V-shaped track for slidably supporting the bottom of said panel.

5. A pet portal for a sliding glass door mounted in a stationary frame comprising:
   a removable panel located in said frame and between the closure edge of said sliding glass door and one side of said frame;
   a pet portal in said panel in the lower portion thereof through which said pet can pass;

lock means on each side of said panel for locking said panel to said sliding glass door on one side thereof and to said stationary frame on the other side thereof;

a crosspiece extending between said sides of said panel at a distance above the bottom of said panel;

a pivot pin extending between said sides below said crosspiece;

said pet portal being located in said panel between said crosspiece and said bottom; and a swinging door pivoted on said pin and normally closing said portal.

6. A pet portal for a sliding glass door mounted in a stationary frame comprising:

a removable panel located in said frame and between the closure edge of said sliding glass door and one side of said frame;

a pet portal in said panel in the lower portion thereof through which said pet can pass;

lock means on each side of said panel for locking said panel to said sliding glass door on one side thereof and to said stationary frame on the other side thereof;

said lock means comprising a female locking member on said frame opposite said other side of said panel and on said one side of said panel; and a male locking member on said glass door opposite said one side and on said panel at said other side in order to lock said panel in position and to lock said glass door to said frame after removal of said panel.

References Cited
UNITED STATES PATENTS 1,294,879  2/1919  Davis _____ 160—90
3,184,803  5/1965  Peel _____ 49—388

KENNETH DOWNEY, Primary Examiner

U.S. Cl. X.R.

49—410, 388; 52—207